UNITED STATES PATENT OFFICE.

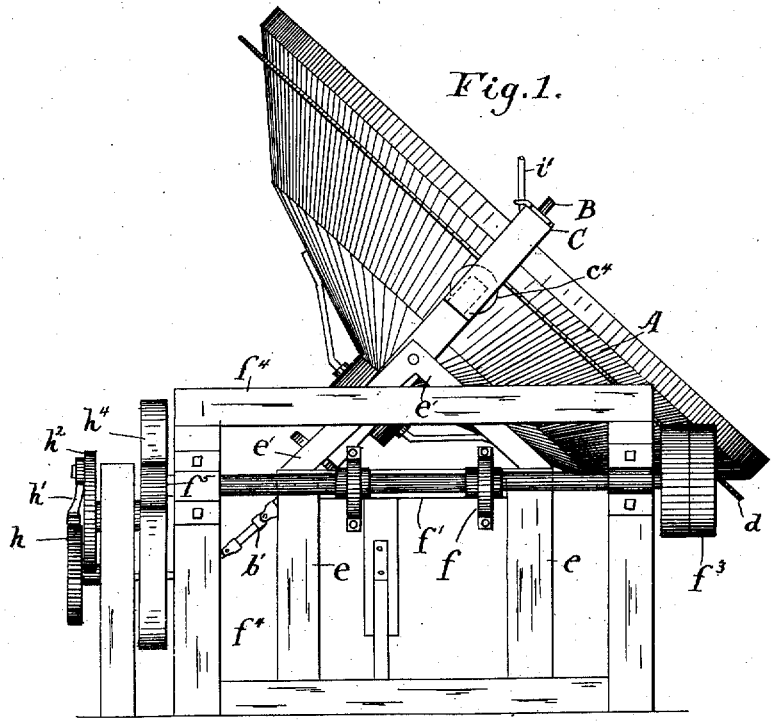
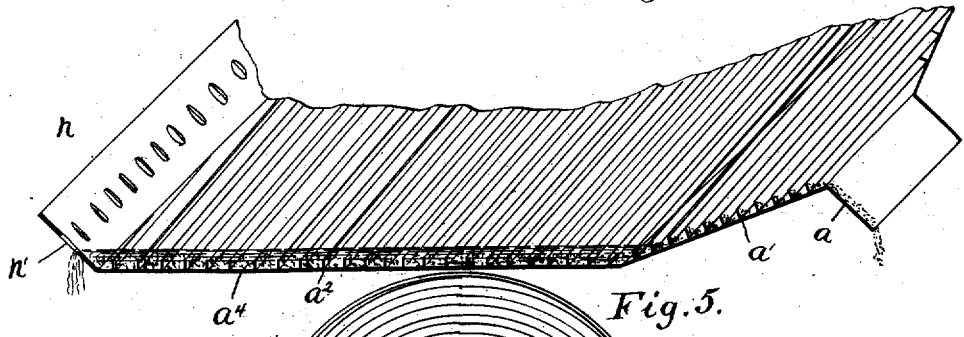

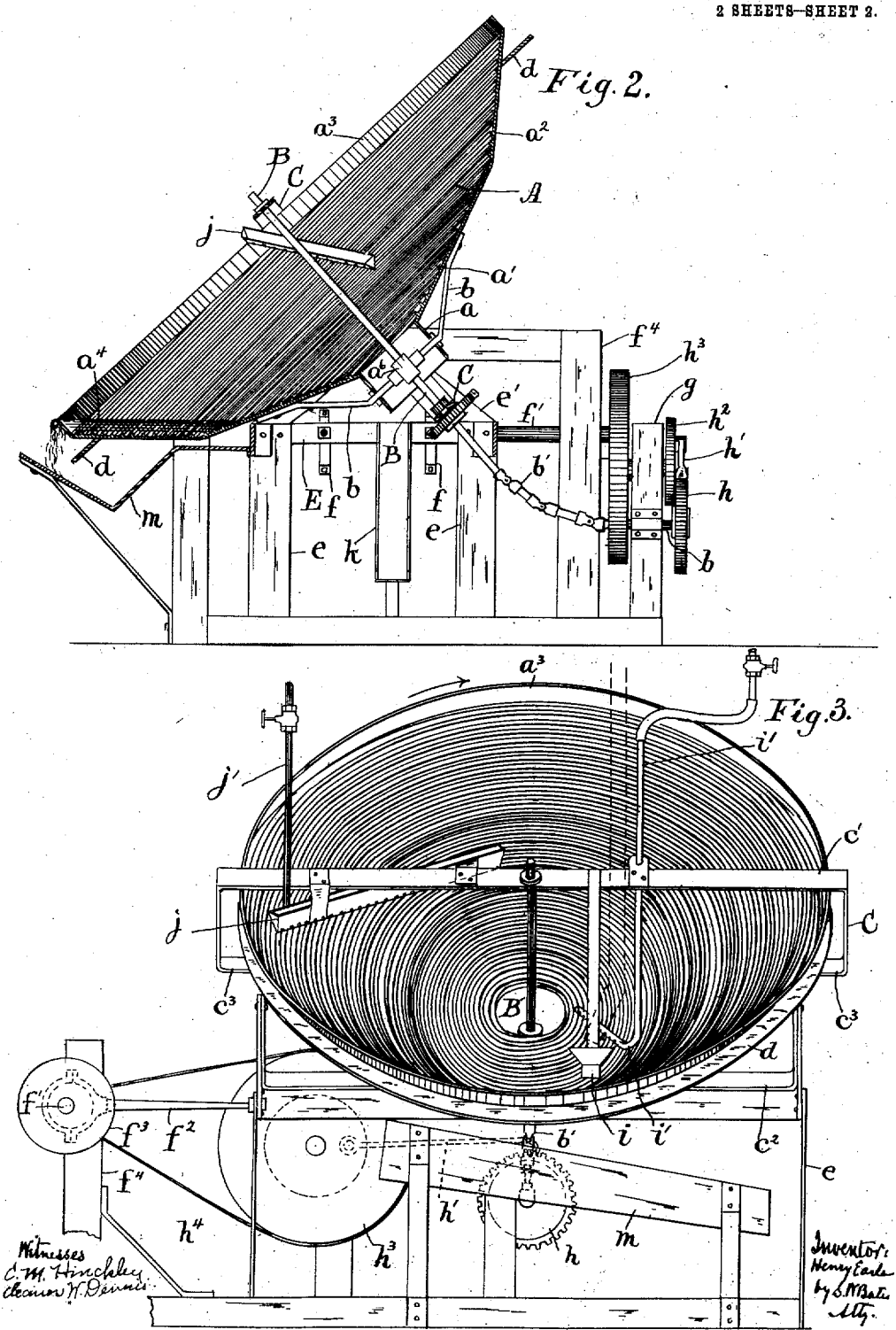

HENRY EARLE, OF DENVER, COLORADO.

ORE-CONCENTRATOR.

987,866.                    Specification of Letters Patent.    Patented Mar. 28, 1911.

Application filed March 16, 1910.   Serial No. 549,599.

*To all whom it may concern:*

Be it known that I, HENRY EARLE, a citizen of the United States of America, and a resident of Denver, in the county of Denver, State of Colorado, have invented certain new and useful Improvements in Ore-Concentrators, of which the following is a specification.

My invention relates to ore concentrators of that class in which the crushed ore is mixed with water and passed over an agitated table or surface containing riffles which catch the heavy concentrates and separate them from the lighter tailings.

The object of my invention is to produce a machine in which the crushed ore will be perfectly and completely separated from the tailings and which may be accurately regulated to concentrate a great variety of ores.

My invention is illustrated in the accompanying drawings in which is shown a machine embodying the several features of my invention although it is to be understood that the details of construction may be greatly varied without departing from the spirit of the invention.

In the drawing, Figure 1 is a side elevation of my concentrator, Fig. 2 is a part side elevation and part central section taken from a point diametrically opposite to that shown in Fig. 1, Fig. 3 is a front elevation looking directly into the pan, Fig. 4 is an enlarged section of the lower portion of the pan showing the stratification of the material, and a modified construction of the rim, Fig. 5 is a diagrammatic plan of the pan showing the course taken by the concentrates, Fig. 6 is a detail of a modification of the construction of the rim of the pan, and Fig. 7 is a cross section through the line $y\ y$ of Fig. 6.

The principal feature of my concentrator is an inclined rotatable table or separator having its surface formed into spiral riffles, the inner ends of which terminate in a discharge opening. This riffled table or surface is preferably made in the form of a shallow pan having an inclined axis of rotation and a central discharge opening surrounded by spiral riffles which extend from the outer portions of the pan inward to the discharge opening. As the pan is rotated the material is washed longitudinally of the riffles and constantly kept at the lower level and following the inward direction of the spiral, they are thus gradually carried to the discharge opening.

As herein shown, the pan which is designated generally by the letter A is generally conical in shape and composed of three sections, namely, an inner section $a'$ adjacent to the center and having a considerable flare, an outer section $a^2$ which has a less flare than the section $a'$ and a rim or band $a^3$ which is shown as substantially cylindrical and parallel with the axis of rotation of the pan. The inner end of the section $a'$ connects with a central tube through which the concentrates are discharged.

The entire inner surface of the pan is covered with a series of riffles spirally arranged and extending from the outer edge and terminating at the discharge tube $a$. These riffles may be corrugations or ribs formed in the material of which the pan is made or they may be secured to the inner surface of the pan in any well known manner. The inner surface of the pan and the riffles are preferably made very smooth for the reason hereinafter stated and in practice I have formed the pan of galvanized sheet iron with the riffles formed in the body of the iron and the inside surface enameled. The pan A is mounted in such a manner as to be rotatable on its axis and as here shown I provide a shaft B which extends centrally through the discharge tube $a$ and thence to a point above the upper rim $a^3$ of the pan.

Means are provided by which the shaft may be tilted at an inclination to the perpendicular for the purpose hereinafter set forth and as here shown, the upper and lower ends of the shaft B are journaled in a yoke or frame C which embraces the pan and serves to hold the same at any desired inclination. The shaft is connected with the pan by means of braces $b$ which connect with a suitable hub $a^6$ secured to the shaft within the tube $a$ and the braces extend thence through the walls of the tube and are riveted or otherwise fastened to the sides of the pan. The yoke C has a horizontal upper bar $c'$ which extends across the top of the pan and a horizontal lower bar $c^2$ parallel with the upper bar but below the lower end of the discharge tube $a$.

Means are provided for relieving the shaft of the entire strain due to the weight of the pan and for this purpose I here show a bearing ring $d$ secured to the outside of the pan a short distance below the rim, this ring being sustained on suitable bearing trucks as $c^4$. The sides of the yoke are inwardly offset to form on each side of the pan a ledge $c^3$ on which is located the antifriction bearing truck $c^4$ already mentioned. Thus the weight of the pan is borne partly by the shaft and the upper and lower bars of the yoke and partly by the trucks $c^4$ and the side bars of the yoke.

Means are provided for tilting the yoke to incline the shaft B to any desired inclination to the perpendicular and as here shown I pivot the sides of the yoke to the uprights $e'$ of the supporting frame E. The frame E is supported in such a way that it can be horizontally oscillated and for this purpose I support the frame on the upper ends of the spring plates $e$ which permit a slight vibratory motion of the frame and the pan and its adjacent parts. A vibratory motion is given to the frame and the pan by eccentrics $f$ on a shaft $f'$ and the eccentrics are connected with the upper portion of the frame E by eccentric rods $f^2$. The shaft $f'$ is journaled in a suitable frame $f^4$ and it has at some suitable point a driving pulley $f^3$.

Means are provided for applying either a continuous or intermittent motion to the shaft B. As here shown, I journal a shaft $b$ in a suitable frame $g$ and connect it to the lower end of the shaft B by means of a flexible shaft $b'$ so that the shaft B will be rotated at whatever inclination it may have. Means are provided for applying an intermittent rotating motion to the pan and for this purpose I secure on the shaft $b$ a ratchet wheel $h$ which is actuated by a pawl $h'$ pivoted on a crank disk $h^2$. Motion is applied to the crank disk by a pulley $h^3$ located on the other end of the disk shaft. The pulley $h^3$ is connected with a small pulley $f^5$ on the end of shaft $f'$ by a belt $h^4$ so that the shaft $f'$ acts to impart vibration to the supporting frame and an intermittent rotary motion to the shaft B. The position of the pawl $h^2$ on the crank disk is preferably so adjusted as to give the shaft one-sixth of a revolution at each turn of the crank disk.

The crushed ore and water are delivered to the pan through a feed spout $i$ through a suitable feed pipe indicated in dotted lines in Fig. 3. Suitable wash water pipes and launders are provided to supply water to the pan as required. As here shown a wash water pipe $i'$ is provided on one side of the lower level of the pan and a suitable wash water launder $j$ is secured to the bar $c'$ on the upper side of the interior surface of the pan in such a position that water is supplied to all the riffles as they move upward from their lower position. A launder $k$ for receiving the concentrates is provided beneath the lower end of the tube $a$ and a launder $m$ is placed under the edge of the pan to receive the overflow water and the tailings. When the pan is in position to be operated, the section $a^2$ of the pan is preferably in a horizontal position so that a shallow basin is formed in connection with the rim. As the ore and water are delivered they flow to this basin and fill it with a shallow layer of crushed ore and water the surplus water flowing over the edge of the rim. The vibration of the pan tends to stratify the ore and lighter minerals causing the former to settle into the spaces between the riffles and the latter to flow over the edge of the riffles and to be washed by the water over the rim of the pan.

At each partial revolution of the pan which moves in the direction indicated by the arrow in Fig. 3, the material in the riffles will rise a short distance out of the pool of water but as soon as the rotation of the pan ceases, the material is all washed back longitudinally of the riffles into the basin or to the lowest part of the riffles. As the riffles are disposed spirally, it will be seen that each time the material is made to move along a riffle, in the direction of the inner motion of the spiral, it approaches nearer to the discharge opening on the principle similar to that of the Archimedean screw. The continual turning of the pan and the washing of the material by water from the launder $j$ along the riffles is constantly bringing it nearer to the center. As this process goes on, the heavier ore tends to be carried upward in the riffles and the lighter tailings to be washed downward over the edge of the riffles so that the ore and the tailings are constantly moving in opposite directions. As the discharge opening is approached, the curvature of the riffles becomes sharper and the tendency of the light mineral to wash over the edge of the riffles greater as the water will tend to flow more nearly at right angles over the edges of the riffles. Thus the concentrates as they approach the point of discharge tend to become more and more perfectly separated from the tailings. At the point where the section $a'$ connects with the section $a^2$, the riffles emerge from the basin and the concentrates as they are washed along the riffles, travel up the slope of the section $a'$ and discharge themselves in the tube $a$ as shown in Figs. 4 and 5.

As pointed out above, it is important to have the inner surface of the pan polished in order that it may slide from under the material as it turns without carrying it far up on the upper slope and so that the concentrates will move readily along the riffles.

In Figs. 4, 6 and 7, I have shown the rim formed with openings so that the water and tailings will pass through the openings instead of over the edge of the rim. By having openings in the rim, I am enabled to regulate their height and capacity so that I may maintain any desired depth of water in the basin. In Fig. 4, $n$ represents the rim with holes $n'$ formed at frequent intervals. In Figs. 6 and 7, I show these openings controlled by an adjustable strip $n^2$ secured to the rim by bolts $n^3$ passing through vertical grooves $n^4$.

It is evident that any suitable means other than those here shown may be used to impart rotation and a shaking motion to the pan.

I claim:—

1. An ore concentrator including a rotatable pan having a series of spiral riffles, and an axis inclined to the perpendicular a rim to said pan for forming a shallow basin when the pan is tilted down, said rim having a series of discharge openings and means for regulating the level of said openings.

2. An ore concentrator including a generally conical rotatable pan having spiral riffles, a shaft for said pan, said pan having a central discharge opening connecting with the inner ends of said riffles, a yoke embracing said pan and having a bearing for said shaft both above and below the pan, a bearing ring secured to said pan in a plane at right angles to its axis, and bearing rolls journaled in said yoke at each side of the pan for supporting said ring.

3. An ore concentrator including a rotatable pan having its axis of rotation inclined to the perpendicular and having a series of spiral riffles, said pan having an outer conical portion normally horizontal in its lower position, an outer rim for forming a basin adapted to hold a shallow body of ore and water in said outer conical portion and an inner conical portion extending above the level of said basin for lifting the concentrates out of the same, a discharge opening being formed in said pan at the center thereof and at the inner termination of said riffles.

4. An ore concentrator including a rotatable pan having its axis of rotation inclined to the perpendicular and having a series of spiral riffles, said pan having an outer conical portion normally horizontal in its lower position, an outer rim having a series of overflow openings therein and forming a basin adapted to hold a shallow body of ore and water in said outer conical portion and an inner conical portion extending above the level of said basin for lifting the concentrates out of the same, a discharge opening being formed at the center of the pan and at the inner termination of said riffles.

In witness whereof I have hereunto set my hand this 9th day of March, 1910.

HENRY EARLE.

Witnesses:
   D. M. GRAY,
   R. M. CASH.

---

Copies of this patent may be obtained for five cents each, by addressing the "Commissioner of Patents, Washington, D. C."